United States Patent [19]

Wolff et al.

[11] Patent Number: 4,636,550

[45] Date of Patent: Jan. 13, 1987

[54] VULCANIZABLE 2-SEC.AMINO-4,6-DIMERCAPTO-S-TRIAZINE CONTAINING HALOGEN RUBBER MIXTURES

[75] Inventors: Siegfried Wolff, Bornheim-Merten; Werner Schwarze, Frankfurt; Heinz Grewatta, Cologne, all of Fed. Rep. of Germany

[73] Assignee: Degussa AG, Frankfurt, Fed. Rep. of Germany

[21] Appl. No.: 756,087

[22] Filed: Jul. 17, 1985

[30] Foreign Application Priority Data

Aug. 18, 1984 [DE] Fed. Rep. of Germany ....... 3430442

[51] Int. Cl.[4] ............................ C08K 3/36; C08K 3/04
[52] U.S. Cl. .................................. 524/552; 524/567; 524/571; 524/572; 524/574; 524/576; 525/331.1; 525/375
[58] Field of Search ............... 524/552, 567, 571, 572, 524/574, 576; 525/331.1, 375

[56] References Cited

U.S. PATENT DOCUMENTS 2,804,450  8/1957  Naylor .............................. 260/92.3
4,269,746  5/1981  Tabar et al. ......................... 524/552

FOREIGN PATENT DOCUMENTS 574837   4/1959  Canada.
51-36275  3/1976  Japan.
55-160037 12/1980 Japan.

OTHER PUBLICATIONS

Murray et al., "The Neoprenes" (1964), pp. 31–39.

*Primary Examiner*—Lewis T. Jacobs
*Attorney, Agent, or Firm*—Cushman, Darby & Cushman

[57] ABSTRACT

The invention is directed to vulcanizable halogen rubber mixtures which contain 2-sec.amino-4,6-dimercapto-s-triazine, silica, and optionally carbon black.

27 Claims, No Drawings

VULCANIZABLE 2-SEC.AMINO-4,6-DIMERCAPTO-S-TRIAZINE CONTAINING HALOGEN RUBBER MIXTURES

BACKGROUND OF THE INVENTION

The invention is directed to 2-sec.amino-4,6-dimercapto-s-triazine containing halogen rubber mixtures which contain a silicatic filler such as silica and optionally carbon black.

The use of the above-mentioned s-triazine derivatives is known in chloroprene rubber from Canadian Pat. No. 574,837, however, in combination with carbon black as the sole filler.

Likewise, mixtures of such triazines with nitrile rubber and fluororubber containing only carbon black are known from Japanese published application No. 80/160 037 (Chem. Abst. Vol. 94 item 1935 10p).

Also, the vulcanization of epichlorohydrin rubbers using 2-anilino-4,6-dimercapto-s-triazine with carbon black as the only filler is shown in Japanese published application No. 76/36275, Chem. Abst. Vol. 85 item 34425.

In comparison to the conventional accelerators, the dimercapto-s-triazines, however, show scarcely any advantage in these systems.

Experiments with the conventional accelerators in halogen rubber mixtures in which the carbon black was completely or to the greatest part replaced by silica led to vulcanizates with lower stress values and higher values for the compression set.

SUMMARY OF THE INVENTION

Therefore, it has been surprisingly found that 2-sec.amino-4,6-dimercapto-s-triazine compounds in vulcanizable silica filled halogen rubber mixtures in contrast lead to higher stress values and smaller values for the compression set.

The subject matter of the invention is 2-sec.amino-4,6-dimercapto-s-triazine containing halogen rubber mixtures which are characterized by the presence of silicatic compounds, especially precipitated finely divided silica, in an amount of 10–100 phr (parts per hundred parts rubber), preferably 10 to 60 phr.

It is also possible to employ in addition to the silicatic filler 10 to 40 phr, preferably 10 to 20 phr of carbon black. Thereby, it should be observed that in comparison to the carbon black the amount of silica always is preponderant. Especially suited are dimercapto-s-triazines of the formula (I):

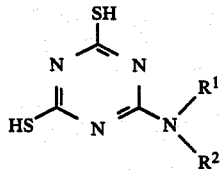

where $R^1$ and $R^2$ are the same or different and are linear or branched saturated alkyl groups having 1 to 5 carbon atoms, e.g., methyl, ethyl, propyl, isopropyl, butyl, sec. butyl, isobutyl or amyl, or a cycloalkyl group having 6 to 8 carbon atoms, e.g., cyclohexyl, cycloheptyl, and cylooctyl, especially $C_6H_{11}$. They are preferably employed alone.

Examples of suitable triazines include 2-dimethylamino-4,6-dimercapto-s-triazine, 2-diethylamino-4,6-dimercapto-s-triazine, 2-methylethylamino-4,6-dimercapto-s-triazine, 2-diisopropylamino-4,6-dimercapto-s-triazine, 2-di-sec.butylamino-4,6-dimercapto-s-triazine, 2-diamylamino-4,6-dimercapto-s-triazine, 2-methylbutylamino-4,6-dimercapto-s-triazine, 2-dicyclohexylamino-4,6-dimercapto-s-triazine, 2-methyl cyclohexylamino-4,6-dimercapto-s-triazine. $R^1$ and $R^2$ can also be other hydrocarbyl groups.

The amount of triazine employed in the mixtures of the invention is 0.25 to 3.0 phr. There are also mixed into the halogen rubbers used additional customary components according to the state of the art. With polychloroprene rubbers, there are preferably employed 1 to 10 phr ZnO, 1 to 10 phr MgO, and optionally 10 to 50 phr plasticizer as well as anti-ager in the customary dosages. Chlorinated polyethylene contains in addition to the amount of silicate fillers according to the invention and optionally carbon black also 1 to 15 phr MgO as well as optionally 1 to 30 phr plasticizer.

If there is employed epichlorohydrin homo or copolymerizate, there is preferably used 1 to 5 phr zinc stearate and 1 to 10 phr MgO as well as optionally plasticizer. In place of zinc stearate, there can also be used ZnO and stearic acid.

On the other hand, there are added to chloro and bromobutyl rubbers suitably 1 to 5 phr stearic acid, 1 to 10 phr ZnO, 1 to 3 phr sulfur as well as optionally plasticizer and adhesive agent.

ZnO and sulfur can also be employed in paste form or as lubricated products for better distribution.

There are enumerated as suitable halogen rubbers especially halogenated butyl rubbers, e.g., chlorobutyl rubber or bromobutyl rubber, chlorinated rubber (i.e., chlorinated natural rubber) polychloroprene, epichlorohydrin homo or copolymerizate, chlorinated polyethylene and polymerizates of 2-chlorobutadiene-1,3-Epichlorohydrin dienterpolymer-(Hydrin ®400).

The silicatic fillers used in accordance with the invention, as well as mixtures of two or more fillers are known fillers in the rubber technology. Thereby, there is included in the concept "silicatic filler" those fillers which consist of silicate, contain silicate and/or contain silicate bound chemically in the widest sense and which are compatible with rubbers or are fillers which are workable in rubber mixtures. There are especially enumerated in the silicatic fillers:

Highly disperse silica fillers (silicon dioxide) with specific surface areas in the range of about 5 to 1000, preferably 20 to 400 m²/g (determined according to the BET method with gaseous nitrogen) and with primary particle sizes in the range of about 10 to 400 nm, which can be produced, e.g., by precipitation of silicates with inorganic acids (e.g., hydrochloric acid or sulfuric acid), by hydrothermal decomposition, by hydrolytic and/or oxidative high temperature reaction, also called flame hydrolysis, of volatile silicon halides (e.g., silicon tetrafluoride, silicon tetrabromide, methyltrichlorsilane, dimethyldichlorosilane) or by an arc process. These silicas optionally also can be present as mixed oxides or oxide mixtures with the oxides of the metals aluminum, magnesium, calcium, barium, zinc, zirconium and/or titanium.

Synthetic silicates, e.g., aluminum silicate or alkaline earth metal silicates such as magnesium or calcium silicate having specific surfaces of about 20 to 400 m²/g and primary particle sizes of about 10 to 400 nm can be used.

Natural silicates, e.g., kaolins, clays, and asbestos as well as natural silicas such as, for example, quartz and kieselguhr can be used.

Glass fibers and glass fiber products such as mats, strands, textile fabrics, glass beads, and the like as well as glass microspheres can also be used.

The silicate fillers mentioned are preferably employed in an amount of 10, or in a given case even below, up to 100 parts by weight based on 100 parts by weight of the rubber polymer.

As mixtures of fillers, there can be mentioned silica/kaolin or silica/glass fibers/asbestos as well as blends of the silicate reinforcing fillers with the known rubber carbon blacks, e.g., silica/ISAF-black or silica/glass fiber cord/HAF black.

According to the invention, there are preferred as silicate fillers the highly dispersed or active silicas, especially the precipitated silicas, and preferably in amount of 10 to 100 parts by weight, based on 100 parts by weight rubber.

Carbon black can additionally be added to the rubbers.

To produce the rubber mixtures which in addition to the components familiar in the rubber industry contain a 2-dialkylamino-4,6-dimercapto-s-triazine as accelerator, there are suited the known mixers.

Mixing methods and mixing times are adjusted to the different polymers.

The compositions can comprise, consist essentially of, or consist of the stated materials.

Unless otherwise indicated, all parts and percentages are by weight.

DETAILED DESCRIPTION

The following table shows the process employing an internal mixer and subsequent mixing steps in each case after the course of the stated times. The flow through temperatures are between 55° and 65° C., preferably at 60° C.

TABLE 1

(1) 0–1 min. ECO, CO, zinc stearate (ZnO, stearic acid)
  1–2.5 min. ½ filler, MgO
  2.5–4 min. ½ filler
  4 min. removing
(2) 0–1 min. polychloroprene
  1–3 min. MgO, stearic acid, Vaseline, ½ filler
  3–5 min. ½ filler, Naftolen ZD
  5 min. removing
(3) 0–3 min. chlorinated PE, filler, Maglite D, DOP
  3–4 min. clearing
  4 min. removing (upside down)
(4) 0–1 min. chloro, bromobutyl
  1–2.5 min ½ filler, stearic acid
  2.5–4 min. ½ filler, plasticizer
  4–4.5 min. clearing
  4.5 min. removing After intermediate storage of the mixtures for 24 hours at room temperature, the accelerator and crosslinker were mixed in on a pair of rolls at a flow through temperature of 45° to 55° C., preferably 50° C.

Industrial areas of use for the described rubber mixtures and their vulcanizates, for example, are: industrial rubber articles such as cable jackets, tubes, air tubes, transmission belts, V-belts, conveyor belts, roll covers, seals, electrical insulation, coatings, impregnants and coatings of heat resistant fabrics, cushioning elements and vibration elements and like articles on which in practice there are placed high requirements.

The physical tests were carried out at room temperature according to the following standard procedures.

| Stress Values in [MPa] | DIN 53504 (German Industrial Standard 53504) |
|---|---|
| 6 mm thick rings | ASTM D 395 |
| Compression Set B | |

Explanation of the abbreviations used and commercial names:

1. Polymers:

| | | |
|---|---|---|
| CM | chlorinated PE | Bayer CM 3630 |
| CR | Polychloroprene | Baypren 210 |
| CO | Epichlorohydrinhomo-polymerizate | Hydrin 100 |
| ECO | Epichlorohydrin-ethylen-oxidecopolymerizate | Hydrin 200 |
| CI-HR | Chlorobutyl | Butyl HT 1068 |
| BR-HR | Bromobutyl | Bromobutyl X2 |

2. Accelerator

| | |
|---|---|
| Echo S | 1,3,4-Thiadiazolen-5-thione-2-thiobenzolate |
| Vanax 808 | N—phenyl-3,5-diethyl-2-propyl-1,4-dihydropyridine |
| Vulkacit Thiuram MS | Tetramethylthiurammonosulfide |
| Vulkacit DOTG | N,N'—Di-o-tolylguanidine |
| Diak Nr. 1 | Hexamethylenediamine carbamate |
| Vulkacit Thiuram | Tetramethylthiuramdisulfide |
| Vulkacit DM | Benzothiazyldisulfide |
| V 25 | 2-Diethylamino-4,6-dimercaptotriazine |
| V 72 | 2-Dimethylamino-4,6-dimercaptotriazine |
| DOP | Dioctylphthalate (plasticizer) |
| Maglite D | Magnesium oxide |
| Naftolen ZD | Aromatic hydrocarbon plasticizer |

Smaller amounts of V 25 lead to higher stress values in comparison to the conventional Echo S/Vanex 808-system as is shown in the two following tables.

TABLE 2

V 25 In CM Filled With Silica

| | 1 | 2 | 3 | 4 | 5 |
|---|---|---|---|---|---|
| Bayer CM 3630 | 100 | 100 | 100 | 100 | 100 |
| Maglite DE | 10 | 10 | 10 | 10 | 10 |
| Ultrasil VN 3 | 50 | 50 | 50 | 50 | 50 |
| DOP | 20 | 20 | 20 | 20 | 20 |
| Echo S | 2.5 | — | — | — | — |
| Vanax 808 | 0.8 | 0.8 | 0.8 | — | — |
| V 25 | — | 1.5 | 2.0 | 1.5 | 2.0 |
| Unaged: | | | | | |
| Vulcanization Temperature: | | | 160° C. | | |
| Vulcanization time: | 40 | 40 | 40 | 40 | 40 |
| (min) | 60 | 60 | 60 | 60 | 60 |
| Stress Value 100% | 5.3 | 5.3 | 6.2 | 6.9 | 7.4 |
| (MPa) | 5.4 | 5.3 | 6.9 | 6.5 | 7.5 |
| Stress Value 200% | 9.2 | 9.3 | 10.8 | 11.5 | 12.2 |
| (MPa) | 9.5 | 9.3 | 11.7 | 11.1 | 12.5 |
| Stress Value 300% | 13.4 | 13.2 | 15.2 | 15.4 | 16.4 |
| (MPa) | 13.6 | 13.4 | 16.3 | 15.2 | 16.7 |
| Elongation at Break | 450 | 390 | 350 | 370 | 310 |
| (%) | 390 | 340 | 310 | 320 | 300 |

TABLE 3

V 72 in CM Filled With Silica

| | 6 | 7 | 8 | 9 | 10 |
|---|---|---|---|---|---|
| Bayer CM 3630 | 100 | 100 | 100 | 100 | 100 |
| Maglite DE | 10 | 10 | 10 | 10 | 10 |
| Ultrasil VN 3 | 50 | 50 | 50 | 50 | 50 |
| DOP | 20 | 20 | 20 | 20 | 20 |
| Echo S | 2.5 | — | — | — | — |

TABLE 3-continued

V 72 in CM Filled With Silica

|  | 6 | 7 | 8 | 9 | 10 |
|---|---|---|---|---|---|
| Vanax 808 | 0.8 | 0.8 | 0.8 | — | — |
| V 72 | — | 1.5 | 2.0 | 1.5 | 2.0 |
| Unaged: | | | | | |
| Vulcanization Temperature: | | | 160° C. | | |
| Vulcanization time (min) | 40 / 60 | 40 / 60 | 40 / 60 | 40 / 60 | 40 / 60 |
| Stress Value 100% (MPa) | 4.1 / 4.1 | 4.5 / 4.8 | 5.3 / 5.5 | 4.6 / 4.7 | 5.4 / 5.4 |
| Stress Value 200% (MPa) | 6.7 / 6.9 | 7.0 / 7.6 | 8.2 / 8.6 | 7.1 / 7.3 | 8.2 / 8.3 |
| Stress Value 300% (MPa) | 10.0 / 10.2 | 10.2 / 11.0 | 11.6 / 12.3 | 10.2 / 10.6 | 11.5 / 11.7 |

TABLE 4

V 72 In CR Filled With Silica
The use of V72 simultaneouly leads to a higher stress value and reduced Compression Set.

|  | 11 | 12 |
|---|---|---|
| Baypren 210 | 100 | 100 |
| MgO, extra light | 4 | 4 |
| Stearic acid | 1 | 1 |
| Vaseline | 1 | 1 |
| Ultrasil VN 3 | 40 | 40 |
| Naftolen ZD | 10 | 10 |
| ZnO RS | 5 | 5 |
| ETU | — | — |
| TMTM | 1 | — |
| DOTG | 0.5 | — |
| Sulfur | 0.5 | — |
| V 75 | — | 0.75 |
| Vulcanization temperature: | 170° C., (60 min) | |
| Stress Value 100% (MPa) | 1.5 | 1.7 |
| Stress Value 200% (MPa) | 2.7 | 3.4 |
| Stress Value 300% (MPa) | 4.1 | 6.0 |
| Compression Set B (Vulcanization time 70 min) 22 h/70° C. (%) | 19.4 | 17.2 |

TABLE 5

V-25 In CR Filled With Carbon Black/Silica
A combination of 3 accelerators can be exchanged by V25 at higher stress value and lower Compression Set

|  | 13 | 14 |
|---|---|---|
| Baypren 210, ML 4 = 50 | 100 | 100 |
| MgO, extra light | 4 | 4 |
| Stearic acid | 1 | 1 |
| Vaseline | 1 | 1 |
| Ultrasil VN 3 | 20 | 20 |
| CORAX N 762 | 20 | 20 |
| Naftolen ZD | 10 | 10 |
| ZnO RS | 5 | 5 |
| Vulkacit NPV/C | — | — |
| Vulkacit Thiuram MS | 1 | — |
| Vulkacit DOTG | 0.5 | — |
| Sulfur | 0.5 | — |
| V 25 | — | 1 |
| Unaged: | | |
| Vulcanization temperature: | 170° C. | |
| Vulcanization time (min) | 20 / 40 | 20 / 40 |
| Stress Value 100% (MPa) | 1.3 / 1.4 | 1.4 / 1.6 |
| Stress Value 200% (MPa) | 2.7 / 2.9 | 3.0 / 3.5 |
| Stress Value 300% (MPa) | 5.1 / 5.4 | 5.6 / 6.5 |
| Compressions Set B (Vulcanization time 50 min) 22 h/70° C. (%) | 10.9 | 7.2 |

TABLE 6

V 25 In CO Filled With Silica
It shows higher stress values at lower Compression Set

|  | 15 | 16 |
|---|---|---|
| Epichlorohydrin monopolynerizate | 100 | 100 |
| Zinc stearate | 1 | — |
| ZnO active | — | 3 |
| Stearic acid | — | 1 |
| MgO, extra light | 3.5 | 3.5 |
| Utirasil VN 3 | 40 | 40 |
| Hexamethylenediamine carbamate | 1.5 | — |
| V 25 | — | 2 |
| Unaged: | | |
| Vulcanization temperature: | 160° C. | |
| Vulcanization time: (min) | 30 | 60 |
| Stress Value 100% (MPa) | 2.7 | 3.3 |
| Stress Value 200% (MPa) | 3.3 | 4.8 |
| Stress Value 300% (MPa) | 4.1 | 6.4 |
| Compression Set B (Vulcanization time 40 min) 22 h/70° C. (%) | 44.2 | 27.3 |

TABLE 7

V 25 In ECO Filled With Silica

|  | 17 | 18 |
|---|---|---|
| Ephichlorohydrin-ethylenoxide copolymerizate | 100 | 100 |
| Zinc stearate | 1 | — |
| ZnO active | — | 3 |
| Stearic acid | — | 1 |
| MgO, extra light | 3.5 | 3.5 |
| Ultrasil VN 3 | 40 | 40 |
| Hexamethylenediamine carbamate | 1.5 | — |
| V 25 | — | 2 |
| Unaged: | | |
| Vulcanization temperature: | 160° C. | |
| Vulcanization time: (min) | 3 / 60 | 4 / 60 |
| Stress Value 100% (MPa) | 2.0 | 3.0 |
| Stress Value 200% (MPa) | 2.8 | 4.5 |
| Stress Value 300% (MPa) | 3.7 | 6.1 |
| Compression Set B (Vulcanization time 70 min) 22 h/70° C. (%) | 31.3 | 22.8 |

TABLE 8

V 25 In Chloro- and Bromobutyl Rubber (Silica Filled)

|  | 19 | 20 | 21 | 22 |
|---|---|---|---|---|
| Chlorobutyl HT 1066 | 100 | 100 | — | — |
| Brombutyl X2 | — | — | 100 | 100 |
| Stearic acid | 1 | 1 | 1 | 1 |
| Ultrasil VN 3 | 40 | 40 | 40 | 40 |
| Sunpar 150 | 5 | 5 | 5 | 5 |
| Koresin | 2 | 2 | 2 | 2 |
| ZnO-Paste | 5 | 5 | 5 | 5 |
| Benzothiazyldisulfide | 1.5 | — | 1.5 | — |
| Tetramethylthiuramdisulfide | 0.5 | — | 0.5 | — |
| V 25 | — | 2 | — | 2 |
| Sulfur-Paste | 1.1 | 1.1 | 1.1 | 1.1 |
| Unaged: | | | | |
| Vulcanization temperature: | 165° C. | | | |
| Vulcanization time: (min) | 60 | 60 | 60 | 60 |
| Stress Value 100% (MPa) | 1.2 | 1.8 | 1.5 | 2.5 |
| Stress Value 200% (MPa) | 1.7 | 2.8 | 2.3 | 4.1 |
| Stress Value 300% | 2.2 | 3.7 | 3.2 | 5.8 |

TABLE 8-continued

| V 25 In Chloro- and Bromobutyl Rubber (Silica Filled) | | | | |
|---|---|---|---|---|
| | 19 | 20 | 21 | 22 |
| (MPa) | | | | |
| Compression Set B | 29.8 | 28.9 | 43.2 | 28.4 |
| (Vulcanization time 70 min) | | | | |
| 22 h/70° C. (%) | | | | |

The entire disclosure of German priority application P3430442.8 is hereby incorporated by reference.

What is claimed is:

1. A vulcanizable halogen containing rubber mixture containing a 2 sec.amino-4,6-dimercapto-s-triazine and also containing 10–100 parts per 100 parts of rubber of a silicatic filler and 0 to 40 parts per hundred parts of rubber of carbon black, the silicatic filler always being present in a preponderant amount when carbon black is present.

2. A vulcanizable halogen containing rubber mixture according to claim 1 wherein the silicatic filler is silica.

3. A vulcanized halogen containing rubber mixture according to claim 2 wherein the silica is a highly dispersed silica.

4. A vulcanizable halogen containing rubber mixture according to claim 1 free of carbon black.

5. A vulcanizable halogen containing rubber mixture according to claim 2 free of carbon black.

6. A vulcanizable halogen containing rubber mixture according to claim 3 free of carbon black.

7. A vulcanizable halogen containing rubber mixture according to claim 1 containing 10 to 40 parts per hundred parts of rubber of carbon black.

8. A vulcanizable halogen containing rubber mixture according to claim 2 containing 10 to 40 parts per hundred parts of rubber of carbon black.

9. A vulcanizable halogen containing rubber mixture according to claim 3 containing 10 to 40 parts per hundred parts of rubber of carbon black.

10. A vulcanizable halogen containing rubber mixture according to claim 1 containing as an accelerator a triazine of the formula I:

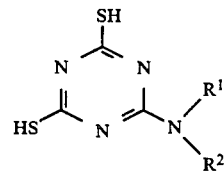

where $R^1$ and $R^2$ are alkyl groups of 1 to 5 carbon atoms or cycloalkyl groups of 6 to 8 carbon atoms.

11. A vulcanizable halogen containing rubber mixture according to claim 10 free of carbon black.

12. A vulcanizable halogen containing rubber mixture according to claim 11 wherein the silicatic filler is silica.

13. A vulcanizable halogen containing rubber mixture according to claim 12 wherein the silica is highly dispersed silica.

14. A vulcanizable halogen containing rubber mixture according to claim 10 containing 10 to 40 parts per hundred parts of rubber of carbon black.

15. A vulcanizable halogen containing rubber mixture according to claim 14 wherein the silicatic filler is silica.

16. A vulcanizable halogen containing rubber mixture according to claim 14 wherein the silica is highly dispersed silica.

17. A vulcanizable halogen containing rubber mixture according to claim 10 where $R^1$ and $R^2$ are methyl or ethyl.

18. A vulcanizable halogen containing rubber mixture according to claim 17 free of carbon black.

19. A vulcanizable halogen containing rubber mixture according to claim 17 containing 10 to 40 parts per hundred parts of rubber of carbon black.

20. A vulcanizable halogen containing rubber mixture according to claim 10 containing 0.25 to 3 phr of the triazine of formula I as the sole accelerator.

21. A vulcanizable halogen containing rubber mixture according to claim 20 free of carbon black.

22. A vulcanizable halogen containing rubber mixture according to claim 20 containing 10 to 40 parts per hundred parts of rubber of carbon black.

23. The product obtained by vulcanizing the mixture of claim 1.

24. The product obtained by vulcanizing the mixture of claim 10.

25. The product obtained by vulcanizing the mixture of claim 11.

26. The product obtained by vulcanizing the mixture of claim 12.

27. A vulcanizable halogenated rubber mixture according to claim 10 wherein the halogenated rubber is halogenated butyl rubber, chlorinated rubber, polychloroprene, 2-chlorobutadiene-1,3 copolymer, epichlorohydrin homo or copolymerizate or chlorinated polyethylene.

* * * * *